(12) United States Patent
Phillips et al.

(10) Patent No.: US 8,405,908 B2
(45) Date of Patent: Mar. 26, 2013

(54) SHADE ASSEMBLY FOR A DISPLAY PANEL

(75) Inventors: Weston Phillips, Cary, NC (US); Dale Backus, Cary, NC (US)

(73) Assignee: SmallHD, LLC, Cary, NC (US)

( * ) Notice: Subject to any disclaimer, the term of this patent is extended or adjusted under 35 U.S.C. 154(b) by 462 days.

(21) Appl. No.: 12/769,738

(22) Filed: Apr. 29, 2010

(65) Prior Publication Data

US 2011/0267695 A1 Nov. 3, 2011

(51) Int. Cl.
*G02B 5/02* (2006.01)

(52) U.S. Cl. ........................................ 359/599; 359/601

(58) Field of Classification Search ............ 359/599, 359/601
See application file for complete search history.

(56) References Cited

U.S. PATENT DOCUMENTS

2004/0075760 A1* 4/2004 Skjellerup et al. ....... 348/333.01

* cited by examiner

*Primary Examiner* — James Jones
(74) *Attorney, Agent, or Firm* — Olive Law Group, PLLC

(57) ABSTRACT

A shade assembly for a display panel is provided. The shade assembly includes a frame having a plurality of elongate support members. Each support member has a flange on a first end thereof for being receivably engaged in a recess defined in the panel. A cover is slideably received by the plurality of elongate support members for shielding indirect light from the display panel.

16 Claims, 3 Drawing Sheets

SHADE ASSEMBLY FOR A DISPLAY PANEL

TECHNICAL FIELD

The presently disclosed subject matter is directed towards a shade assembly, and more particularly, towards a shade assembly for use with an electronic display screen.

BACKGROUND

Many electronic devices with display screens are portable so that the operator or user can enjoy the electronic device in a variety of settings. Unfortunately, these display screens can be difficult to view when in a sunny or bright location. Excessive light causes a "washout" effect on the display screen such that the operator or user cannot easily view the screen. The operator must then increase the screen's brightness, thereby decreasing the battery life of the device, or shade the display screen to reduce the "washout" effect. One manner of shading the display screen may include placing one's hand in view of the sunlight or excessive brightness, however, this is uncomfortable for the user or operator. Another manner of shading the display assembly may include providing a shade apparatus that is affixed to the display assembly. However, these apparatus may suffer from many drawbacks as they may be bulky, aesthetically displeasing, expensive to manufacture, or suffer from various other drawbacks.

Accordingly, there remains a need to a shade assembly that addresses the various drawbacks associated with shade assemblies known in the prior art.

SUMMARY

According to one aspect of the disclosed subject matter, a shade assembly for a display panel is provided. The shade assembly includes a frame including a plurality of elongate support members and each support member has a flange on a first end thereof for being receivably engaged in a recess defined in the panel. A cover is slideably received by the plurality of elongate support members for shielding indirect light from the display panel.

According to another aspect of the disclosed subject matter, the cover includes a plurality of sleeves defined on a surface thereof, each sleeve slideably receiving each elongate support member.

According to another aspect of the disclosed subject matter, the cover includes a loop of material and each sleeve is formed by a plurality of stitching extending through spaced-apart portions of the cover.

According to another aspect of the disclosed subject matter, each recess is defined on an outermost periphery of the panel such that the cover projects from about the outermost periphery of the panel to thereby define a hood for viewing the panel.

According to another aspect of the disclosed subject matter, each support member further defines a shoulder that carries the flange for resting against the panel.

According to another aspect of the disclosed subject matter, a panel engaging portion of the shoulder has a shape that approximates a shape of a shoulder engaging portion of the panel.

According to another aspect of the disclosed subject matter, the panel is a generally rectangular prism having a first generally rectangular major surface, a spaced-apart, generally parallel, a generally rectangular second major surface, and a sidewall connecting the first and second major surfaces.

According to another aspect of the disclosed subject matter, the sidewall forms an edge portion defined between opposing corners of each of the first and second major surfaces, and further wherein, each edge portion defines the recess, such that each support member generally extends from opposing corners of each of the first and second major surfaces.

According to another aspect of the disclosed subject matter, a display assembly is provided. The display assembly includes a display panel having a display surface, a frame including a plurality of elongate support members, each support member having a flange on a first end thereof for being receivably engaged in a recess defined in the panel, and a cover slideably received by the plurality of elongate support members for shielding indirect light from the display panel.

According to another aspect of the disclosed subject matter, the display panel further includes a power source for providing power to the display panel.

According to another aspect of the disclosed subject matter, the sidewall forms an edge portion defined between opposing corners of each of the first and second major surfaces, and further wherein, each edge portion defines the recess, such that each support member generally extends from opposing corners of each of the first and second major surfaces.

According to another aspect of the disclosed subject matter, a display assembly is provided. The display assembly includes a frame having a plurality of generally parallel, spaced-apart, elongate support members, each support member having a flange on a first end thereof and a rectangular prism shaped display panel having a display surface, a spaced-apart mounting surface, and a sidewall interconnecting the display surface and the mounting surface. The sidewall defines recesses that extend from about each of the corners of the display surface to the mounting surface for receivably engaging a respective support member of the plurality of elongate support members. The plurality of elongate support members are positioned so as to extend towards a viewing area of the display surface. A cover for shielding indirect light from the display panel is provided and has a plurality of sleeves, each sleeve slideably receiving each support member of the plurality of elongate support members and being formed by stitching that extends though spaced-apart portions of the cover.

BRIEF DESCRIPTION OF THE DRAWINGS

The foregoing summary, as well as the following detailed description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed. In the drawings.

DETAILED DESCRIPTION

The presently disclosed subject matter is described with specificity to meet statutory requirements. However, the description itself is not intended to limit the scope of this patent. Rather, the inventors have contemplated that the claimed subject matter might also be embodied in other ways, to include different steps or elements similar to the ones described in this document, in conjunction with other present or future technologies. Moreover, although the term "step" may be used herein to connote different aspects of methods employed, the term should not be interpreted as implying any particular order among or between various steps herein disclosed unless and except when the order of individual steps is explicitly described.

Figure 1:
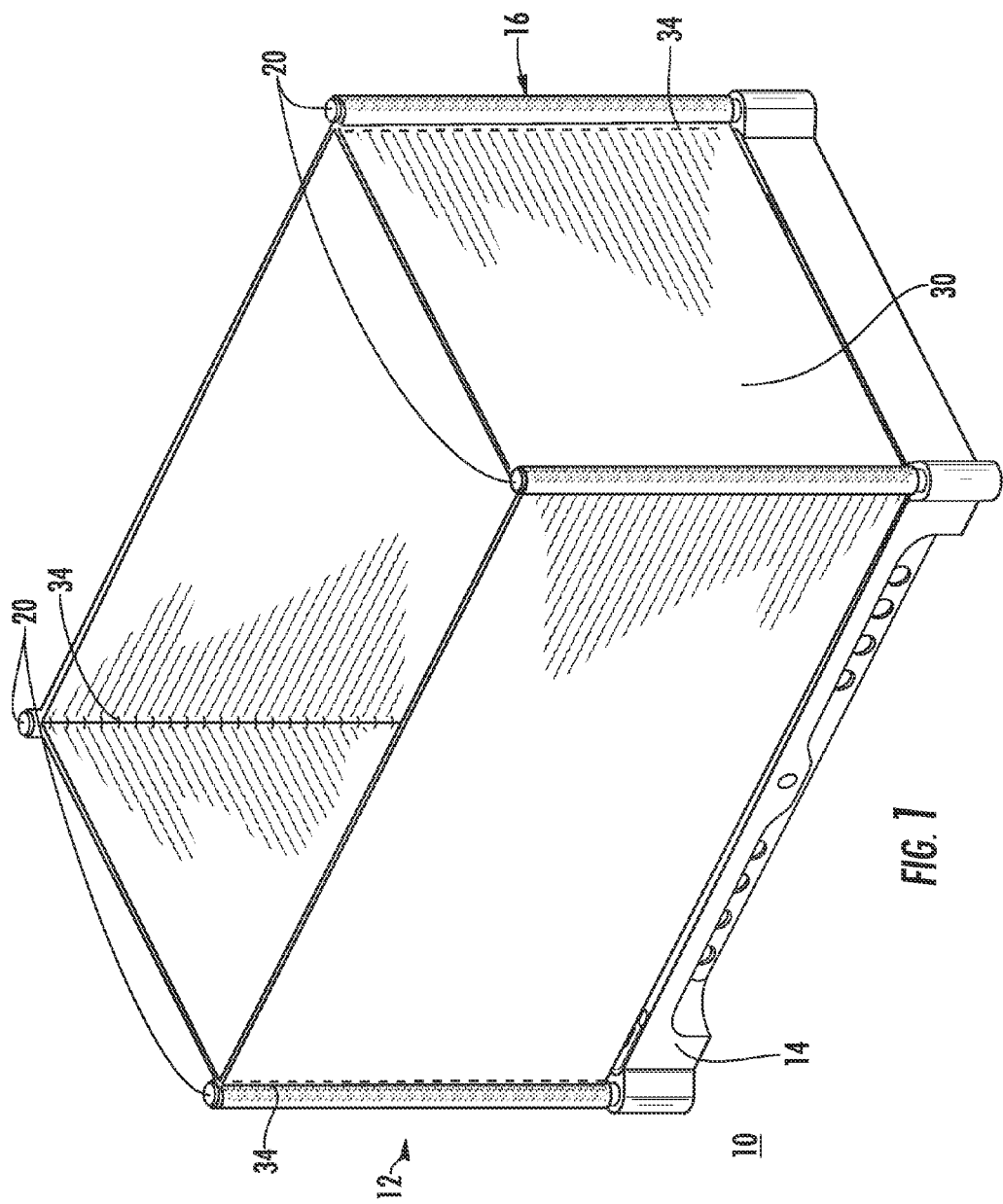
FIG. 1 is a perspective view of a shade assembly installed upon a display panel according to an embodiment of the disclosed subject matter.
Figure 2:
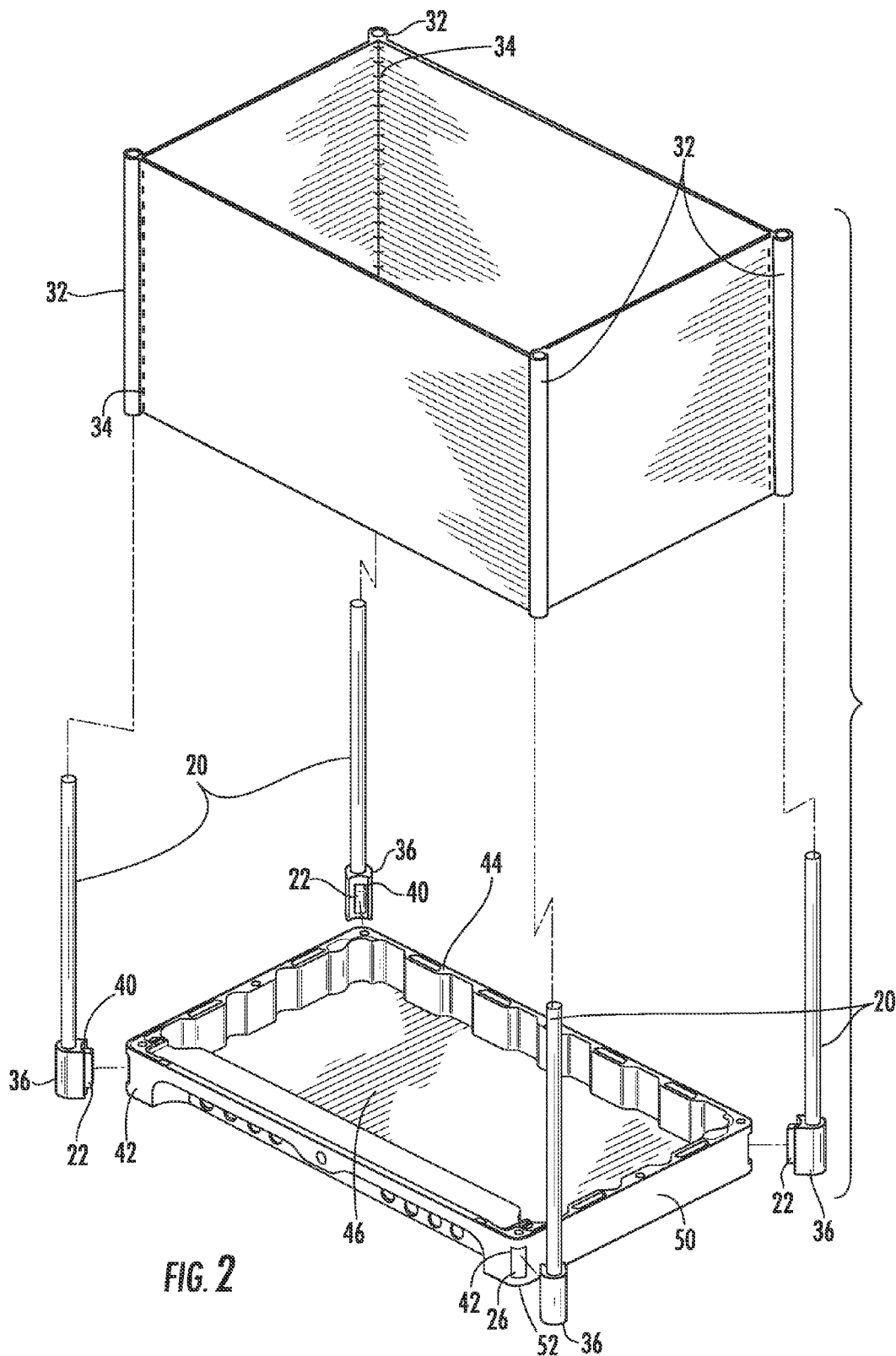
FIG. 2 is an exploded perspective view of a shade assembly and display panel according to an embodiment of the disclosed subject matter.

FIG. 1 illustrates a display assembly that is generally designated as 10 throughout the drawings. The display assembly 10 includes a shade assembly 12 that is configured for attaching to a display panel 14. A frame 16 is provided that extends from the display panel 14 and is configured for carrying a cover 30 that provides shade to the display panel 14. The support members 20 are configured for extending towards an operator or user viewing the display panel 14. The frame 16 includes a plurality of elongate support members 20 that extend from the display panel 14. Each elongate support member 20 includes a flange 22 on a first end 24 thereof. The flange 22 is provided for being selectively and engageably received within a cooperatively sized recess 26 which is defined in the panel.

The cover 30 is made from a portion of material, and in some embodiments, may be elastic, light untransmissive material. The cover 30 is configured such that a plurality of stitching 34 extends between spaced-apart positions of the portion of material so as to form sleeves 32. These sleeves 32 are sized in such a manner that the elongate support members 20 can slide within the sleeves 32 and sufficient tension exists on the sleeves 32 so that the induced friction on the contact between sleeves 32 and support members 20 will maintain the support members 20 in place unless removed by the operator.

Figure 3:
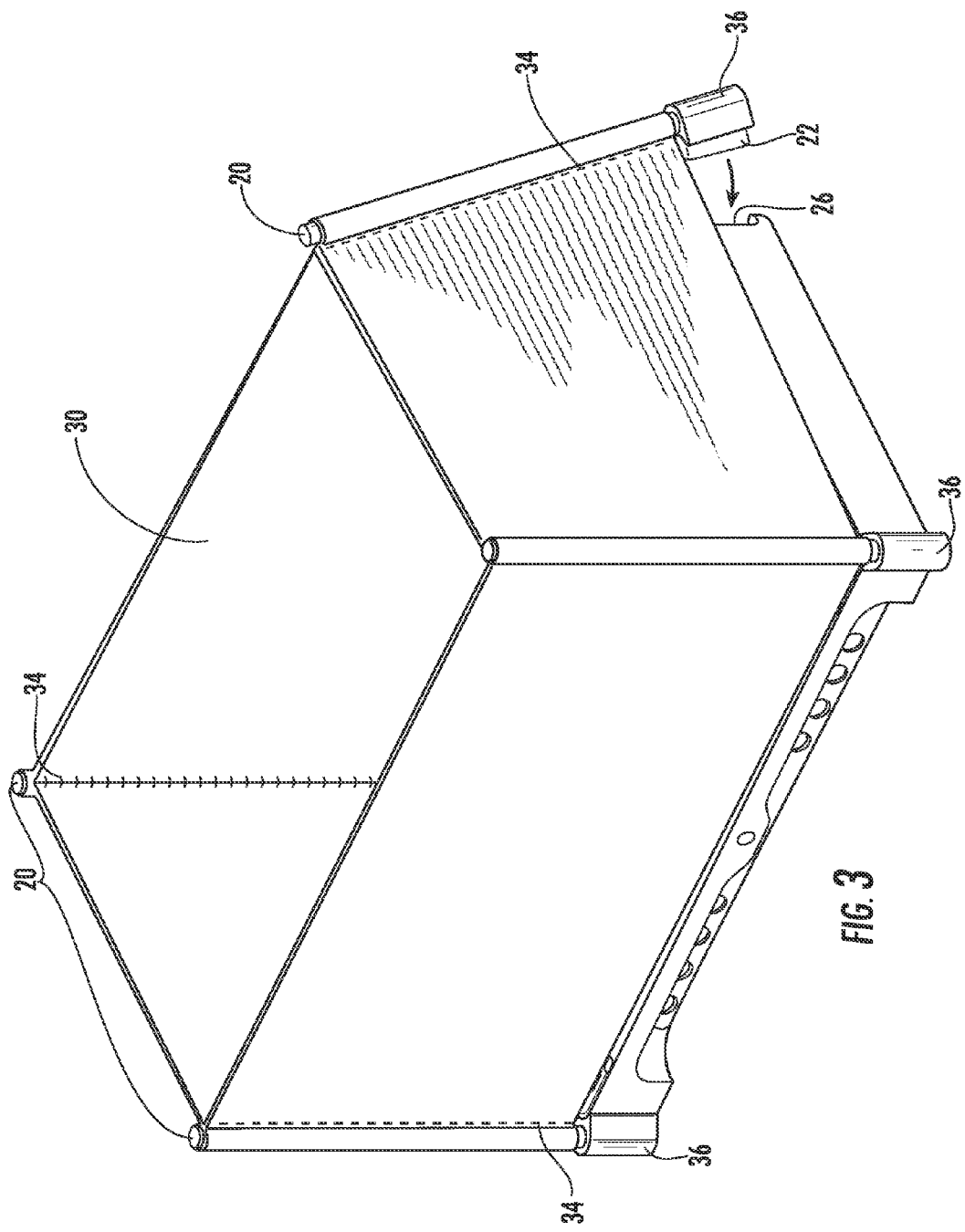
FIG. 3 is a perspective view of a shade assembly being installed upon a display panel according to an embodiment of the disclosed subject matter.

As illustrated more clearly in FIG. 3, the support member 20 may also include a shoulder 36 that carries the flange 22. The shoulder 36 defines a panel engaging portion 40 and the panel 14 defines a shoulder engaging portion 42. In one embodiment, the panel engaging portion 40 and the shoulder engaging portion 42 may have generally equal shapes such that a flush mating relationship is established when the support member 20 is installed upon the panel 14. As illustrated in FIG. 3, the panel 14 may be a generally rectangular prism having a generally rectangular first major surface 44 and a spaced-apart, generally parallel, generally rectangular second major surface 46. A sidewall 50 interconnects the first major surface 44 to the second major surface 46. A video display screen or similar device may be received within the area defined between the generally rectangular first major surface 44 and the generally rectangular second major surface 46 and is contained by the sidewall 50. Each corner portion of the first major surface 44 and second major surface 46 may include a rounded edged portion 52 that has a generally flat area that defines the recess 26.

Installation of the shade assembly 12 onto the display panel 14 may be accomplished in at least two ways. One method is to engage the flange 22 of each of the support members 20 in each of the corresponding recesses 26 defined in the panel 14 in a manner such that the support members 20 extend towards an operator viewing the panel 14. The cover 30 may then be installed by sliding cover 30 into a position such that each sleeve 32 is in generally alignment with the elongated portions of each support member 20. The cover 30 is then slid towards the display panel 14 until the lowermost portion of the cover 30 is proximal to the display panel 14. Another manner of installing the shade assembly 12 onto the display panel is to slide each sleeve 32 of the cover 30 onto each support member 20 before support members 20 are installed on the panel 14. Then each support member 20 can be positioned proximal the panel 14 and installed by placing the flange 22 into recess 26. In the panel 14 illustrated in FIG. 3, the operator may find that each of the first three support members 20 are easily installed, while the fourth support member 20 must be installed by stretching the cover 30 to create sufficient slack for the fourth support member 20 to reach to its corresponding recess 26. Disassembly is carried out in a reverse order from assembly of the display assembly 10.

The panel 14 may include various input and output adaptors for receiving and transmitting various signals from a display screen or similar device housed by the panel 14 such as a video output or input and a power source for providing power to the display screen. Panel 14 may be fabricated from any suitable material, and in some embodiments may be CNC fabricated from aluminum stock. In other embodiments, the aluminum stock may be anodized to provide a surface finish.

While the embodiments have been described in connection with the preferred embodiments of the various figures, it is to be understood that other similar embodiments may be used or modifications and additions may be made to the described embodiment for performing the same function without deviating therefrom. Therefore, the disclosed embodiments should not be limited to any single embodiment, but rather should be construed in breadth and scope in accordance with the appended claims.

What is claimed:

1. A shade assembly for a display panel, comprising:
a frame including a plurality of elongate support members, each support member having a flange on a first end thereof for being receivably engaged in a recess defined in the panel and further defining a shoulder that carries the flange for resting against the panel; and
a cover slideably received by the plurality of elongate support members for shielding indirect light from the display panel.

2. The shade assembly according to claim 1, wherein the cover includes a plurality of sleeves defined on a surface thereof, each sleeve slideably receiving each elongate support member.

3. The shade assembly according to claim 2, wherein the cover comprises a loop of material and each sleeve is formed by a plurality of stitching extending through spaced-apart portions of the cover.

4. The shade assembly according to claim 1, wherein each recess is defined on an outermost periphery of the panel such that the cover projects from about the outermost periphery of the panel to thereby define a hood for viewing the panel.

5. The shade assembly according to claim 1, wherein a panel engaging portion of the shoulder has a shape that approximates a shape of a shoulder engaging portion of the panel.

6. The shade assembly according to claim 1, wherein the panel is a generally rectangular prism having a first generally rectangular major surface, a spaced-apart, generally parallel, a generally rectangular second major surface, and a sidewall connecting the first and second major surfaces.

7. The shade assembly according to claim 6, wherein the sidewall forms an edge portion defined between opposing corners of each of the first and second major surfaces, and further wherein, each edge portion defines the recess, such that each support member generally extends from opposing corners of each of the first and second major surfaces.

8. A display assembly, comprising:
a display panel having a display surface;
a frame including a plurality of elongate support members, each support member having a flange on a first end thereof for being receivably engaged in a recess defined in the panel and further defining a shoulder that carries the flange for resting against the panel; and
a cover slideably received by the plurality of elongate support members for shielding indirect light from the display panel.

9. The display assembly according to claim 8, wherein the cover includes a plurality of sleeves defined on a surface thereof, each sleeve slideably receiving each elongate support member.

10. The display assembly according to claim 9, wherein the cover comprises a loop of material and each sleeve is formed by a plurality of stitching extending through spaced-apart portions of the cover.

11. The display assembly according to claim 8, wherein each recess is defined on an outermost periphery of the panel such that the cover projects from about the outermost periphery of the panel to thereby define a hood for viewing the panel.

12. The display assembly according to claim 8, wherein a panel engaging portion of the shoulder has a shape that approximates a shape of a shoulder engaging portion of the panel.

13. The display assembly according to claim 8, wherein the display panel further includes a power source for providing power to the display panel.

14. The display assembly according to claim 8, wherein the panel is a generally rectangular prism having a first generally rectangular major surface, a spaced-apart, generally parallel, a generally rectangular second major surface, and a sidewall connecting the first and second major surfaces.

15. The display assembly according to claim 9, wherein the sidewall forms an edge portion defined between opposing corners of each of the first and second major surfaces, and further wherein, each edge portion defines the recess, such that each support member generally extends from opposing corners of each of the first and second major surfaces.

16. A shade assembly for a display panel, comprising:
a frame including a plurality of elongate support members, each support member having a flange on a first end thereof for being receivably engaged in a recess defined in the panel; and
a cover that includes a plurality of sleeves that slideably receive the plurality of elongate support members for shielding indirect light from the display panel,
wherein the cover comprises a loop of material and each sleeve is formed by a plurality of stitching extending through spaced-apart portions of the cover.

* * * * *